United States Patent
Upadhyay et al.

(10) Patent No.: US 11,436,089 B2
(45) Date of Patent: Sep. 6, 2022

(54) IDENTIFYING DATABASE BACKUP COPY CHAINING

(71) Applicant: EMC IP Holding Company LLC, Hopkinton, MA (US)

(72) Inventors: Navneet Upadhyay, Ghaziabad (IN); Rejith Mohan M, Thiruvanathapuram (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 128 days.

(21) Appl. No.: 17/075,043

(22) Filed: Oct. 20, 2020

(65) Prior Publication Data

US 2022/0121523 A1   Apr. 21, 2022

(51) Int. Cl.
*G06F 12/00* (2006.01)
*G06F 11/14* (2006.01)
*G06F 3/06* (2006.01)

(52) U.S. Cl.
CPC ......... *G06F 11/1448* (2013.01); *G06F 3/065* (2013.01); *G06F 11/1464* (2013.01); *G06F 2201/80* (2013.01)

(58) Field of Classification Search
CPC ............. G06F 11/1448; G06F 11/1464; G06F 2201/80; G06F 3/064
See application file for complete search history.

(56) References Cited

U.S. PATENT DOCUMENTS

| | | | |
|---|---|---|---|
| 8,838,539 B1 * | 9/2014 | Ashcraft | G06F 12/0806 707/637 |
| 10,452,680 B1 * | 10/2019 | Fan | G06F 16/27 |
| 2015/0379062 A1 * | 12/2015 | Vermeulen | G06F 16/2365 707/691 |

* cited by examiner

*Primary Examiner* — Shawn Xgu
(74) *Attorney, Agent, or Firm* — Todd A. Noah; Dergosits & Noah LLP (57) ABSTRACT

System extracts backup metadata, comprising committed change numbers, system change numbers, types, database version identifiers, and details, for backup copies. System generates data structure, comprising start system change numbers, based on minimums of system committed change numbers, end system change numbers and maximums of system change numbers, database version identifiers, and identifiers including details, for the backup copies. System identifies at least first type of backup copies as candidate dependent backup copies and at least second type of backup copies as candidate preceding backup copies. System outputs identifiers of candidate dependent backup copy, corresponding dependency, and candidate preceding backup copy, based on identifying same database version identifier of candidate dependent backup copy and candidate preceding backup copy, and maximum of end system change numbers of candidate preceding backup copies which is less than or equal to start system change number and/or end system change number of candidate dependent backup copy.

20 Claims, 3 Drawing Sheets

IDENTIFYING DATABASE BACKUP COPY CHAINING

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

A data object may be stored on a storage array, which may be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

A backup/restore application can create a full backup copy for a data object by backing up all of the data in the data object. A full backup copy may be created at infrequent intervals and can serve as a reference point for subsequent incremental cumulative backup copies, incremental differential backup copies, transaction log backup copies, and/or auxiliary backup copies. A backup/restore application can create an incremental cumulative backup copy for a data object by backing up all of the data that has changed in the data object since the last full backup copy was created for the data object. As the elapsed time increases since the most recent full backup copy, the accumulated changes increase in a data object, as does the time to create an incremental cumulative backup copy. A backup/restore application can create an incremental differential backup copy for a data object by backing up only data that is new or changed in the data object since the most recent previous backup copy was created, which may have been a full backup copy, an incremental cumulative backup copy, or another incremental differential backup copy. Since an incremental differential backup copy does not store duplicate copies of unchanged data, a system can efficiently store more backup copies created at more points in time by organizing the data into increments of change between points in time.

A backup/restore application can create a transaction log backup copy for a data object by only backing up a history of actions executed by the data object's management system. The data object's management system can use a transaction log backup copy to re-apply the changes made by committed transitions that are not materialized in a data object and roll back the changes to a data object that were made by uncommitted transactions. A transaction log may be referred to as a redo log, and a stored copy of a transaction log may be referred to as an archive redo log, an archive log, or an archive log backup copy. A backup/restore application can create an auxiliary backup copy for a control file by only backing up a control file. A control file may be a small binary collection of data that records the physical structure of a database, and can include the database name, the names and locations of associated datafiles and online redo log files, the timestamp of the database creation, the current log sequence number, and checkpoint information.

A backup/restore application can use an application data manager that requests application data management agents on application hosts to discover the application resources that are stored on these hosts, such as discovering the application host configurations (which may be referred to as application servers), the file systems, the applications, the databases, and the copy metadata of all backups on all application hosts. After discovering these application resources, the application data management agents can send copies of these application resources and information about these application resources to the requesting application data manager.

A backup copy of/for a data object may depend on another backup copy of the data object when the backup copy is used to restore or recover the data object to a previous state of the data object. For example, an incremental cumulative backup copy of a database depends upon the preceding full backup copy of the database because data from the incremental cumulative backup copy needs to be combined with data from the preceding full backup copy to restore or recover the database to the state of the database at the time that the incremental cumulative backup copy was created. In this example, the incremental cumulative backup copy may be referred to as a dependent backup copy because it depends on another backup copy, and the full backup copy may be referred to as a base backup copy because another backup copy depends on it by using it as a basis for the recovery. In similar examples, each of an archive log backup copy and an auxiliary backup copy may depend on the preceding full backup copy and therefore each may be referred to as a dependent backup copy. For some types of databases, a full backup copy of the database may be referred to as an independent backup copy because the data from the full backup copy does not need to be combined with anything from any other backup copy to restore the database to the state that the database was in at the time that the full backup copy was created. However, for other types of databases, a full backup copy of the database may be referred to as an dependent backup copy because the data from the full backup copy needs to be combined with something from another backup copy to restore the database to the state that the database was in at the time that the full backup copy was created.

In a different example, a specific incremental differential backup copy may depend on the preceding full backup copy, and may also depend on the preceding incremental cumulative backup copy that was created after the preceding full backup copy was created, if such a preceding incremental cumulative backup copy exists. Additionally, the specific incremental differential backup copy may depend on any preceding incremental differential backup copies that may have been created before the specific incremental differential backup copy was created and after the preceding full backup copy was created. In this example, the specific incremental backup copy may be referred to as a dependent backup copy, and the preceding full backup copy may be referred to as a base backup copy. While any intervening incremental backup copies may be referred to as a base backup copy, since the dependent backup copy is an incremental differential backup copy, any intervening incremental backup copy may be referred to as a previous backup copy instead of a base backup copy. An incremental differential backup copy which depends on another incremental differential backup copy, which depends on an incremental cumulative backup copy, which depends on a full backup copy most clearly illustrates the concept of a backup copy chain or the chaining of backup copies. However, any number of backup copies that depend on other backup copies, even a single backup copy that depends on one other backup copy, may be referred to a backup copy chain or the chaining of backup copies.

After an application data manager discovers an application resource, a backup/restore application creates a backup copy for the application resource and assigns the retention time to the backup copy. For example, a backup/restore application creates a full backup copy of an Oracle database from 7:30 P.M. to 11:30 P.M. on April $15^{th}$, and an auxiliary backup copy for the Oracle database at 11:30 P.M. on April $15^{th}$, and assigns a 1-month retention to the full backup copy and the auxiliary backup copy. which means that the full backup copy and the auxiliary backup copy are scheduled to expire on May $15^{th}$. Continuing the example, the backup/restore application creates an archive log backup copy for the Oracle database from 1:00 A.M. to 1:15 A.M. on April $16^{th}$, an incremental cumulative backup copy of the Oracle database from 5:00 A.M. to 6:00 A.M. on April $16^{th}$, a first incremental differential backup copy of the Oracle database from 7:30 A.M. to 8:00 A.M. on April $16^{th}$, and a second incremental differential backup copy of the Oracle database from 8:30 A.M. to 9:00 A.M. on April $16^{th}$. The backup/restore application assigns a 1-month retention to the archive log backup copy, the incremental cumulative backup copy. and the incremental differential backup copies, which means that the archive log backup copy, the incremental cumulative backup copy. and the incremental differential backup copies are scheduled to expire on May $16^{th}$. However, when the full backup copy expires on May $15^{th}$, the archive log backup copy, incremental cumulative backup copy. and incremental differential backup copies that depend on the expired full backup copy become useless, even though none of these dependent backup copies have expired.

Consequently, the retention times may need to be adjusted for any dependent backup copy and/or for any backup copy upon which any other backup copies depend. Additionally, when a specific backup copy is deleted for any reason, a backup/restore application should also delete all of the backup copies that depend on the specific backup copy because these dependent backup copies will become useless after the specific backup copy upon which they depend is deleted. In some use cases, a user might want to cloud-tier or replicate a specific backup copy. Performing these operations just for the specific backup copy would be of no use unless the backup copy that this specific backup copy depends upon is also cloud tiered or replicated.

Traditional solutions to such problems require storing backup copy metadata in a local datastore (such as a SQL Lite or proprietary flat file format) during backup operations, by reading the backup copy metadata from the local datastore during copy discovery, analyzing the backup copy metadata, and then providing the analyzed backup copy dependency information. However, in a clustered environment, these traditional solutions can only report a backup copy dependency for the node from which the backup copy was created, such that a backup copy that was created for node 1 cannot be discovered when node 2 is executing and node 1 is unavailable. Furthermore, if two parallel backup operations are creating a full backup copy and an incremental differential backup copy, and the incremental differential backup copy is completely created after the full backup copy starts being created and before the full backup copy is completely created, traditional solutions lack the capability to determine that the incremental differential backup copy depends upon the full backup copy.

DETAILED DESCRIPTION

Embodiments herein enable identifying database backup copy chaining. A system extracts backup metadata, comprising system committed change numbers, system change numbers, types, database version identifiers, and details, for backup copies. The system generates a data structure, comprising start system change numbers, based on minimums of the system committed change numbers, end system change numbers, based on maximums of the system change numbers, the database version identifiers, and identifiers including the details, for the backup copies. The system identifies at least a first type of the backup copies as candidate dependent backup copies and at least a second type of the backup copies as candidate preceding backup copies. The system outputs identifiers of a candidate dependent backup copy, a corresponding dependency, and a candidate preceding backup copy, based on identifying, in the data structure, a same database version identifier of the candidate dependent backup copy and the candidate preceding backup copy, and a maximum of the end system change numbers of the candidate preceding backup copies which is less than or equal to a start system change number and/or an end system change number of the candidate dependent backup copy.

For example, while node #2 in a 2-node cluster is unavailable, a backup server accesses node #1 and identifies an Oracle control file's information about a full backup copy of node #2's Oracle database created from 7:30 P.M. to 11:30 P.M. on April $15^{th}$, an auxiliary backup copy of node #2's Oracle database created at 11:30 P.M. on April $15^{th}$, and an archive log backup copy of node #1's Oracle database created from 1:00 A.M. to 1:15 A.M. on April $16^{th}$. The backup server also identifies the Oracle control file's information about an incremental cumulative backup copy of node #1's Oracle database created from 5:00 A.M. to 6:00 A.M. on April $16^{th}$, an incremental differential backup copy of node #1's Oracle database created from 7:30 A.M. to 8:00 A.M. on April $16^{th}$, and another incremental differential backup copy of node #1's Oracle database created from 8:30 A.M. to 9:00 A.M. on April $16^{th}$. The backup server extracts the database version identifiers for the backup copies, generates the backup copies' natural identifiers based on their details, calculates the start system change numbers as the minimums of the system committed change numbers for the backup copies, and calculates the end system change numbers as the maximums of the system change numbers for the backup copies.

The backup server creates maps that use the database version identifiers and parts of the backup copies' natural identifiers as their keys, and use other maps as their values.

The other maps use the end system change numbers as their keys and use the start system change numbers and the backup copies' natural identifiers as their values. The backup server uses the shared database version identifier for backup copies and parts of these backup copies' natural identifiers to access the maps and investigate whether the auxiliary backup copy for node #2's Oracle database, the archive log backup copy for node #1's Oracle database, the incremental cumulative backup copy of node #1's Oracle database, and the two incremental differential backup copies of node #1's Oracle database are dependent backup copies. The backup server also uses the shared database version identifier for backup copies and parts of these backup copies' natural identifiers to access the maps and investigate whether the full backup copy of node #2's Oracle database, the incremental cumulative backup copy of node #1's Oracle database, and the two incremental differential backup copies of node #1's Oracle database are base backup copies or previous backup copies.

The backup server can determine that the end time of 11:30 P.M. on April $15^{th}$ for the full backup copy of April 15 is the maximum end time of any full backup copy's end time that is less than or equivalent to the end time of 11:30 P.M. on April $15^{th}$ for the auxiliary backup copy of April $15^{th}$. Therefore, the backup server can output information specifying that the auxiliary backup copy for node #2's Oracle database created at 11:30 P.M. on April $15^{th}$ depends on the full backup copy of node #2's Oracle database created from 7:30 P.M. to 11:30 P.M. on April $15^{th}$.

The backup server can also determine that the end system change number's value of 1594 for the full backup copy of April $15^{th}$ is the maximum system change number of any full backup copy's end system change number that is less than or equal to the start system change number's value of 1604 for the archive log backup copy of April $16^{th}$. Therefore, the backup server can output information specifying that the archive log backup copy for node #1's Oracle database created from 1:00 A.M. to 1:15 A.M. on April $16^{th}$ depends on the full backup copy of node #2's Oracle database created from 7:30 P.M. to 11:30 P.M. on April $15^{th}$.

The backup server can additionally determine that the end system change number's value of 1594 for the full backup copy of April $15^{th}$ is the maximum system change number of any full backup copy's end system change number that is less than or equal to the start system change number's value of 1620 for the incremental cumulative backup copy of April $16^{th}$. Therefore, the backup server can output information specifying that the incremental cumulative backup copy of node #1's Oracle database created from 5:00 A.M. to 6:00 A.M. on April $16^{th}$ depends on the full backup copy of node #2's Oracle database created from 7:30 P.M. to 11:30 P.M. on April $15^{th}$.

The backup server can similarly determine that the end system change number's value of 1624 for the incremental cumulative backup copy of April $16^{th}$ is the maximum system change number of any incremental backup copy's end system change number that is less than or equal to the start system change number's value of 1630 for the first incremental differential backup copy of April $16^{th}$. Therefore, the backup server can output information specifying that the first incremental differential backup copy of node #1's Oracle database created from 7:30 A.M. to 8:00 A.M. on April $16^{th}$ depends on the incremental cumulative backup copy of node #1's Oracle database created from 5:00 A.M. to 6:00 A.M. on April $16^{th}$.

The backup server can further determine that the end system change number's value of 1632 for the first incremental differential backup copy of April $16^{th}$ is the maximum system change number of any incremental backup copy's end system change number that is less than or equal to the start system change number's value of 1634 for the second incremental differential backup copy of April $16^{th}$. Therefore, the backup server can output information specifying that the incremental differential backup copy of node #1's Oracle database created from 8:30 A.M. to 9:00 A.M. on April $16^{th}$ depends on the incremental differential backup copy of node #1's Oracle database created from 7:30 A.M. to 8:00 A.M on April $16^{th}$. Rather than assigning a 1-month retention to node #2's backup copies of April $15^{th}$ and to node #1's backup copies of April $16^{th}$, which would result in node #1's backup copies of April $16^{th}$ becoming useless on May $15^{th}$ when node #2's backup copies of April $15^{th}$ expire, the backup server uses the identified dependencies of the backup copies to increase the retention date for node #2's backup copies from May $15^{th}$ to May $16^{th}$.

Figure 1:
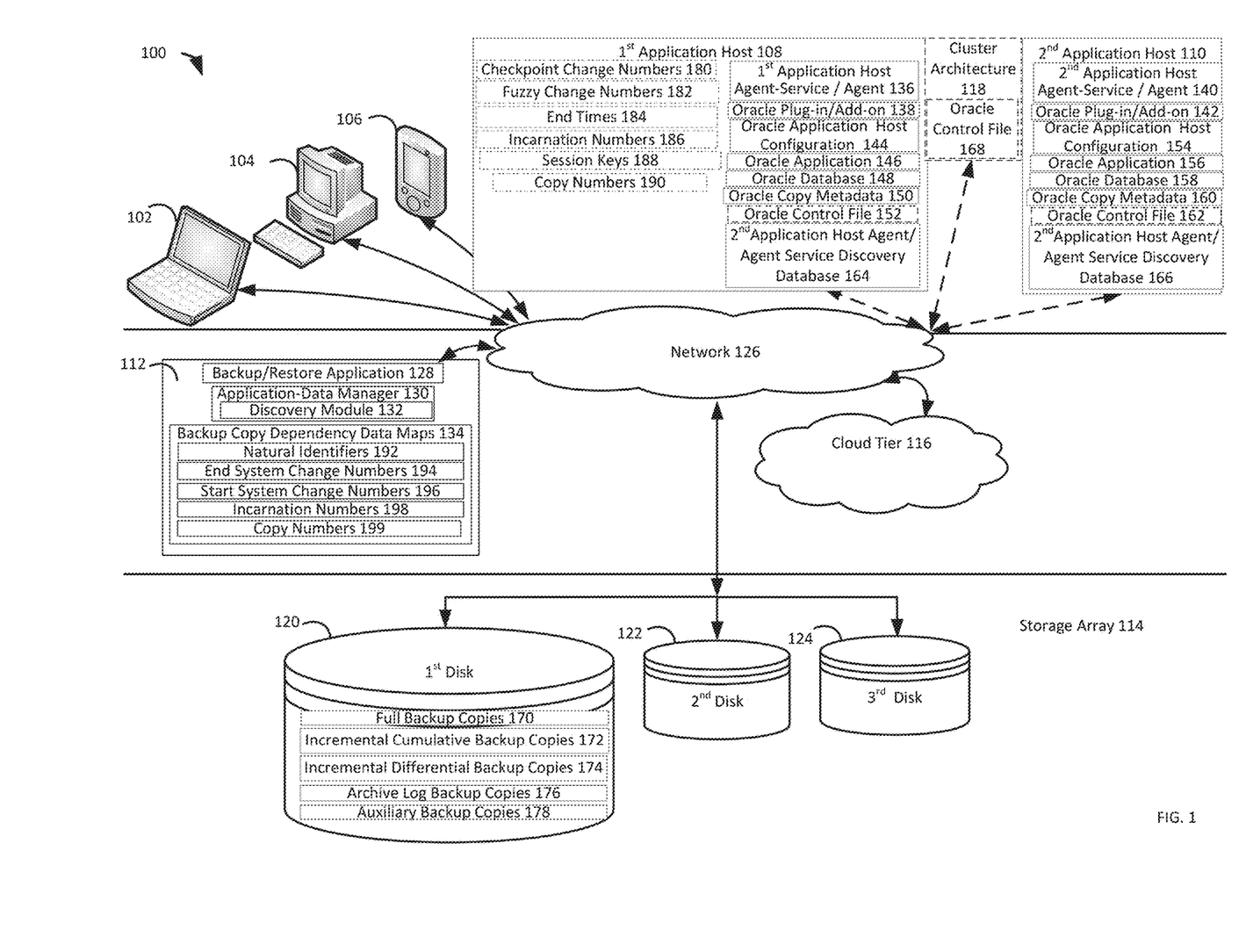
FIG. 1 illustrates a block diagram of an example system for identifying database backup copy chaining, under an embodiment.

FIG. 1 illustrates a diagram of a system 100 for identifying database backup copy chaining, under an embodiment. As shown in FIG. 1, the system 100 may illustrate a cloud computing environment in which data, applications, services, and other application resources are stored and delivered through shared data centers and appear as a single point of access for the users. The system 100 may also represent any other type of distributed computer network environment in which servers control the storage and distribution of application resources and services for different client users.

In an embodiment, the system 100 represents a cloud computing system that includes a first client 102, a second client 104, a third client 106, a fourth client 108, and a fifth client 110; and a server 112, a storage array 114, and a cloud tier 116 that may be provided by a hosting company. If the fourth client 108 and the fifth client 110 are in a cluster, such as an Oracle Real Application Cluster, then the clients 108 and 110 are connected by cluster architecture 118, and may be referred to as a first cluster node 108 and a second cluster node 110. The storage array 114 includes a first disk 120, a second disk 122, and a third disk 124. The clients 102-110, the server 112, the storage array 114, the cloud tier 116, and the optional cluster architecture 118 communicate via a network 126.

Although FIG. 1 depicts the first client 102 as a laptop computer 102, the second client 104 as a personal computer 104, the third client 106 as a smartphone 106, the fourth client 108 as an application host 108, and the fifth client 110 as an application host 110, each of the clients 102-110 may be any type of computer. Even though FIG. 1 depicts the system 100 with five clients 102-110, one server 112, one storage array 114, one cloud tier 116, one cluster architecture 118, three disks 120-124, and one network 126, the system 100 may include any number of clients 102-110, any number of servers 112, any number of storage arrays 114, any number of cloud tiers 116, any number of cluster architectures 118, any number of disks 120-124, and any number of networks 126. The clients 102-110 and the server 112 may each be substantially similar to the system 300 depicted in FIG. 3 and described below.

The server 112, which may be referred to as a backup server 112, includes a backup/restore application 128 that can create backup files of data objects for the clients 102-110, and execute a restore based on the backup files stored on the storage array 114 and/or the cloud tier 116. The backup/restore application 128 can provide centralized administration, such as scheduling, monitoring, and managing backup operations and backup files. The backup/restore application 128 can enable the storing of backup operation schedules, client policies, and client configurations. The backup/restore application 128 can provide a unique interface to the clients 102-110 during login, and also assist the backup server 112 in authenticating and registering the clients 102-110. The backup/restore application 128 can send backup/restore work orders to the clients 102-110, which can receive and process the work orders to start a backup or restore operation. The backup/restore application 128 can maintain a local database of all processes that execute on the backup server 112. The backup/restore application 128 can execute server-side processes for a system administrator's graphical management console, which may enable the system administrator to use command line interface tools for queries. For example, a system administrator identifies the clients 102-110 registered with the backup server 112.

The backup server 110 also includes an application data manager 130, which includes a discovery module 132 and possibly includes backup copy dependency data maps 134. As described below, the backup/restore application 128 can use the application data manager 130 to backup data objects and restore data objects, and use the discovery module 132 to request for clients to discover data for their application resources. As also described below, the application data manager 130 can use the discovery module 132 to access the clients 108 and/or 110 to generate the backup copy dependency data maps 134. FIG. 1 depicts the backup/restore application 128 and the application data manager 130 residing completely on the backup server 112, but the backup/restore application 128 and/or the application data manager 130 may reside in any combination of partially on the backup server 112, partially on another server which is not depicted in FIG. 1, and partially on the clients 102-110.

Using a generic data model and discovery protocol, the application data manager 130 can discover data for application resources via an application host agent-service which can generically use an add-on to discover data for different application resources on the clients 102-110. Alternatively, using application vendor-specific logic, the application data manager 130 can discover data for application resources via an application host agent which can use a vendor-specific plug-in to discover data for different application resources and their backup copies on the clients 102-110. Therefore, the application data manager 130 can discover data for application resources via a first application host agent-service or agent 136 which can use an Oracle Plug-in or Add-on 138 to discover data for the application resources on the first application host 108, and discover data for application resources via a second application host agent-service or agent 140 which can use an Oracle Plug-in or Add-on 142 to discover data for the application resources on the second application host 110. Although FIG. 1 does not depict the following components, the application data manager 130 can discover data for application resources via a laptop agent-service or agent which can use a SQL Plug-in or Add-on to discover data for the application resources on the laptop computer 102, and discover data for application resources via a smartphone agent-service or agent which can use a Microsoft Outlook Plug-in or Add-on to discover data for the application resources on the smartphone 106.

In an example using the generic data model, after registering the first application host 108, the application data manager 130 can discover data for application resources on the first application host 108 via the first application host agent-service 136 which can use the Oracle add-on 138 to discover data for an Oracle application host configuration 144, an Oracle application 146, an Oracle database 148, Oracle copy metadata 150, and an Oracle control file 152. In another example using the generic data model, after registering the second application host 110, the application data manager 130 can discover data for application resources on the second application host 110 via the second application host agent-service 140 which can use the Oracle add-on 142 to discover data for an Oracle application host configuration 154, an Oracle application 156, an Oracle database 158, Oracle copy metadata 160, and an Oracle control file 162. The first application host agent-service 136 may store its discovered data in a first application host agent service discovery database 164, and the second application host agent-service 140 may store its discovered data in a second application host agent service discovery database 166. If the fourth client 108 and the fifth client 110 are the first cluster node 108 and the second cluster node 110 in a cluster, such as an Oracle Real Application Cluster, then the nodes 108 and 110 are connected by the cluster architecture 118 and share an Oracle control file 168, instead of having their own independent Oracle control files 152 and 162, respectively. In some embodiments, the discovery module 132 can use one component for discovering application resources other than copies of metadata, such as the databases 148 and 158, and use another component dedicated to discovering copies of metadata, such as the copy metadata 150 and 160.

Although FIG. 1 does not depict the following components, after registering the smartphone 106, the application data manager 130 can discover data for application resources on the smartphone 106 via the smartphone agent-service which can use a Microsoft® Outlook add-on to discover data for a Microsoft® Outlook application host configuration, a Microsoft® Outlook application, a Microsoft® Outlook database, and Microsoft® Outlook copy metadata, and store the discovered data in a smartphone discovery database. Similarly, after registering the laptop computer 102, the application data manager 130 can discover data for the application resources on the laptop computer 102 via a laptop computer host agent which can use a SQL Plug-in to discover data for a SQL application host configuration, a SQL application, a SQL database, and SQL copy metadata and store the discovered data in a laptop discovery database.

FIG. 1 depicts the system 100 with two clients 108-110 that communicate via two agent-services or agents 136 and 140 which use two Add-ons or Plug-ins 138 and 142 to discover data for eight application resources 144-162 for two applications 146 and 156, and store discovered data in two discovery databases 164 and 166. However, the system 100 may include any number of clients 102-108 that communicate via any number of agent-services or agents 136 and 140 which use any number of Add-ons or Plug-ins 138 and 142 to discover data for any number of application resources 144-162 for any number of applications 146 and 156, and store discovered data in any number of discovery databases 164 and 166.

After an application host 108 or 110 discovers an application resource and creates a backup copy of an application resource, the backup server 112 can request the application host 108 or 110 to move the short-term retention backup copy to the backup server 112 for long-term retention. For example, the application data manager 130 makes a REST application programming interface call to the application host agent-services 136 to move the backup copy of the Oracle database 148 from the application host 108. Following receipt of a request to move a backup copy of an application resource, an application host 108 or 110 can move a short-term retention backup copy to the backup server 112 for long-term retention. For example, the application host agent-services 136 moves the backup copy of the Oracle database 148 from the application host 108 to the application data manager 130, which stores the backup copy of the Oracle database 148 in the first disk 120. While the application host 108 has limited capacity for storing the short-term backup copies, the storage array 114 has capacity for storing the long-term backup copies on a long-term basis. The backup/restore application 128 can also store metadata for a database and its transaction logs in remote storage. For example, the storage array 114 stores the metadata for a full backup copy and an archive log backup copy for the Oracle database 148.

Then the backup/restore application 128 can receive information about backup copies, generate the backup copy dependency data maps 134 for backup copies, and subsequently use the backup copy dependency data maps 134 to adjust retention times when dependent backup copies or their base backup copies are deleted, replicated, and/or relocated. The copy discovery output provides all the information about the backup copies that the backup/restore application 128 has created, which are mainly grouped based on their backup copy types, such as full backup copies 170, incremental cumulative backup copies 172, incremental differential backup copies 174, archive log backup copies 176, and auxiliary backup copies 178, which are depicted as stored in the first disk 120 of the storage array 114, but which may be stored in any of the disks 120-124 or the cloud-tier 116. The incremental cumulative backup copies 172, the incremental differential backup copies 174, the archive log backup copies 176, and the auxiliary backup copies 178 have no relevance on their own because they need information about the full backup copies 170 that they depend upon to restore a data object to the state of the data object at the time that the backup copies 172-178 were created.

A full backup copy 170 can be a duplicate of all data in a data object. An incremental cumulative backup copy 172 can be a duplicate of all data that has changed in a data object since the last duplicate was created of all data in the data object. An incremental differential backup copy 174 can be a duplicate of only data that is new or changed in a data object since the most recent previous duplicate was created of data in the data object. An archive log backup copy 176 can be a duplicate of the history of some actions executed by a data object's management system. An auxiliary backup copy 178 can be a duplicate of a system's control file.

A backup server 112 may begin the process of retrieving information about the backup copies 170-178 by outputting a discovery request for an application's resources to the application's host. For example, the backup server 112 executes the discovery module 132 in the application data manager 130, which makes REST (Representational State Transfer) application programming interface calls to request the agent-services or agents 136 and 140 that are executing on the clients 108 and 110, which may be referred to as the application hosts 108 and 110, to discover their application resources. Examples of the application resources include the Oracle application host configurations 144 and 154, the Oracle applications 146 and 156, the Oracle databases 148 and 158, the Oracle copy metadata 150 and 160 of backup copies for the clients 108 and 110, the Oracle control files 152 and 162 or the Oracle control file 168, and any corresponding file systems.

A backup server can be a computer that executes computer programs which assist client devices in storing copies of data objects for retention within dedicated files. Information can be data as processed, stored, or transmitted by a computer. A backup copy can be a record of at least some of the information needed to restore a data object to a state at a specific time when the information was recorded. A discovery request can be a solicitation to identify application resources. An application resource can be an asset used by a program that executes a particular task or set of tasks. An application host can be a computer that executes a computer program that performs a particular task or set of tasks.

Alternatively, the agent-services or agents 136 and 140 independently discover the application resources 144-162 on the clients 108 and 110, without having received any discovery request from the application data manager's discovery module 132. In this way, the agent-services or agents 136 and 140 are resilient to transient issues, such as unavailability of the application data manager 130 or an error on the network 126.

During copy discovery, the system 100 receives backup copy dependency data about the backup copies 170-178 from a database management system. For example, during copy discovery the first and/or second Application Host Agent-Service/Agent 136 and/or 140 queries various views of the Oracle control file(s) 152 and/or 162 or 168 to retrieve information about the Oracle backup copies 170-178 and the system 100 uses the retrieved information to identify backup copy dependency data. Although this disclosure describes examples of the system 100 using an Oracle database management system and its components, the system 100 may also use other types of database management systems and their components.

The Oracle database management system can continually synchronize the Oracle control file 168 for all nodes 108 and 110 in an Oracle Real Application Cluster architecture 118, and can enable all real application cluster nodes 108 and 110 to access the Oracle control file 168 because a proper control file is necessary for an Oracle database management system to function. Since the backup/restore application 128 backs up the Oracle control file(s) 152 and/or 162 or 168 along with any backup of the corresponding Oracle database 148 and/or 158, there is no way for the backup copy dependency data in the Oracle control file(s) 152 and/or 162 or 168 to be lost. For example, the discovery module 132 accesses the first cluster node 108 while the second cluster node 110 is unavailable, and identifies the Oracle control file 168's information about the full backup copy 170 of the second cluster node 110's Oracle database 158 created from 7:30 P.M. to 11:30 P.M. on April 15$^{th}$, the auxiliary backup copy 178 for the second cluster node 110's Oracle database 158 created at 11:30 P.M. on April 15$^{th}$, and the archive log backup copy 176 for the first cluster node 108's Oracle database 148 created from 1:00 A.M. to 1:15 A.M. on April 16$^{th}$. The discovery module 132 also identifies the Oracle control file 168's information about the incremental cumulative backup copy 172 of the first cluster node 108's Oracle database 148 created from 5:00 A.M. to 6:00 A.M. on April 16$^{th}$, the incremental differential backup copy 174 of the first cluster node 108's Oracle database 148 created from 7:30 A.M. to 8:00 A.M. on April 16$^{th}$, and the other incremental differential backup copy 174 of the first cluster node 108's Oracle database 148 created from 8:30 A.M. to 9:00 A.M. on April 16$^{th}$.

The first and/or second Application Host Agent-Service/Agent 136 and/or 140 can use an Oracle Cloud Interface (OCI) to connect to views of the Oracle control file(s) 152 and/or 162 or 168 and implement a SQL query using dynamic performance (V$) views of an Oracle database management system to fetch the required information about the backup copies 170-178. These views may include a V$BACKUP_DATAFILE view, a V$RMAN_BACKUP_SUBJOB_DETAILS view, a V$DATABASE_INCARNATION view, and a V$BACKUP_PIECE_DETAILS view.

The V$BACKUP_DATAFILE view displays information about the Oracle control file(s) 152 and/or 162 or 168 and datafiles in backup sets from the Oracle control file(s) 152 and/or 162 or 168, including a checkpoint change number 180 and an absolute fuzzy change number 182, as depicted in FIG. 1. The checkpoint change number 180 for a backup copy of a database identifies all changes up to the checkpoint change number which are included in the backup copy. The absolute fuzzy change number 182 for a backup copy of a database identifies the backup copy's highest system change number that corresponds to an uncommitted transaction. If the backup copy has no uncommitted transactions, then the value of the absolute fuzzy change number 182 is null. If the backup copy has uncommitted transactions, then the value of the absolute fuzzy change number 182 is the highest system change number of an archive log that contains an uncommitted transaction.

For example, if the system creates a full backup copy of a database when the system change numbers for committed transactions range from the value of 1578 to 1594 and the system change numbers for uncommitted transactions range from the value of 1595 to 1599, then the values of the checkpoint change number 180 are 1578 to 1594 with a minimum of 1578 and a maximum of 1594, and the value of the absolute fuzzy change number 182 are 1595 to 1599, with a minimum of 1595 and a maximum of 1599. In another example, if the system creates a full backup copy of a database when the system change numbers for committed transactions range from the value of 1578 to 1594 and there are no uncommitted transactions, then the values of the checkpoint change number 180 are 1578 to 1594 with a minimum of 1578 and a maximum of 1594, and the value of the absolute fuzzy change number 182 is null. The checkpoint change number 180 for a backup copy may be referred to as a system committed change number 180, which can be a logical time stamp that is associated with a completed transaction. The fuzzy change number 182 for a backup copy may be referred to as a system change number 182, which can be a logical time stamp.

The V$RMAN_BACKUP_SUBJOB_DETAILS view provides information about a recovery manager job, including an end time 184 for a backup copy. The end time 184 for a backup copy identifies the time of the last BACKUP command in the recovery manager job which created the backup copy. An end time 184 can be a most recent chronological record associated with a backup copy.

The V$DATABASE_INCARNATION view provides information about database incarnations. A database incarnation number 186, or simply an incarnation number 186, for a backup copy specifies the record identifier for the branch record in the Oracle control file(s) 152 and/or 162 or 168. An Oracle database management system creates a new incarnation of a database whenever the database is opened with the reset logs option. An incarnation number 186 may be referred to as a database version identifier 186, which can be a sequence of characters used to refer to a particular release of a structured set of information held in and accessible by a computer.

The V$BACKUP_PIECE_DETAILS view provides information about available backup pieces or copies, including a session key 188 and a copy number 190. The session key 188 for a backup copy, which may be referred to as a session identifier 188, indicates an identifier of the session during which the backup copy was created. The copy number 190 for a backup copy indicates the number of copies for backup pieces created with duplex enabled, which may include up to 4 copies that correspond to 4 simultaneously created duplicate backup copies. The copy number 190's value is 1 if a backup piece is not created with duplex enabled. A session key 188 can be an identifier of a backup job which is associated with a specific time period. A copy number 190 can be a count of simultaneously created duplicates of data in a data object.

First, the system 100 extracts backup metadata, which includes the system committed change numbers 180, the system change numbers 182, the types of the backup copies 170-178, the database version identifiers, and the details, which include the end time 184, the session key 188, and the copy number 190, for the backup copies 170-178. Then the system 100 uses the identified attributes of the checkpoint change number 180, the absolute fuzzy change number 182, the end time 184, the incarnation number 186, the session key 188, and the copy number 190 for each of the backup copies 170-178 to determine a natural identifier 192, a start system change number 194, and an end system change number 196 for each of the backup copies 170-178. Backup metadata can be information about records of at least some of the information needed to restore a data object to states at specific times when the records were created. A detail can be an individual feature associated with a backup copy.

The system 100 determines the natural identifier 192 for each of the backup copies 170-178 by combining the attribute session key 188 from the V$BACKUP_PIECE_DETAILS view, the attribute end time 184 from the V$RMAN_BACKUP_SUBJOB_DETAILS view, and the attribute copy number 190 from the V$BACKUP_PIECE_DETAILS view. A natural identifier 192, which may be referred to as an identifier 192 of a backup copy, can be a sequence of characters associated with a backup copy.

The system 100 combines the session key 188, the end time 184, and the copy number 190 in the natural identifier 192 to uniquely identify each of the backup copies 170-178. For example, if the Oracle recovery manager simultaneously creates 3 duplicate backup copies with duplex enabled, and the backup/restore application 128 stores these 3 duplicate backup copies on the storage array 114's three disks 120-124, any backup copy dependency data that identifies any 1 of the 3 duplicate backup copies as a dependent backup copy would need to also be applied to the 2 remaining duplicate backup copies. Consequently, the system 100 incorporates the copy number 190 in the natural identifiers 192 to track and differentiate between any simultaneously created duplicate backup copies. While the system 100 incorporates the copy number 190 in the natural identifiers 192 to differentiate between backup copies that were created during the same session at the same time, the system 100 also incorporates the end times 184 and the session keys 188 into the natural identifier identifiers 192 to differentiate between backup copies that were created during different sessions and/or at different times.

The system 100 creates a natural identifier 192 for a base copy, or a base copy natural identifier, which identifies any full backup copy which another backup copy may depend upon. Since incremental differential backup copies may depend on a previous incremental backup copy, during copy discovery the system 100 creates a natural identifier 192 for a previous copy, or a previous copy natural identifier, which identifies any previous incremental backup copy upon which another incremental differential backup copy depends.

The system 100 calculates the end system change number 194 for a backup copy as the maximum of absolute fuzzy change number 182 from the V$BACKUP_DATAFILE view for the backup copy, if the absolute fuzzy change number is not null. If the absolute fuzzy change number 182 is null, then the system 100 calculates the end system change number 194 for a backup copy as being equal to the maximum checkpoint change number 180 from the V$BACKUP_DATAFILE view for the backup copy. For example, since the system change numbers range from the value of 1578 to the value of 1594 for the full backup copy 170 of the second cluster node 110's Oracle database 158 created from 7:30 P.M. to 11:30 P.M. on April 15$^{th}$, and the second cluster node 110 created a checkpoint after committing the transactions that corresponds to the system change numbers with the values of 1578-1594, the end system change number 194's value is 1594 for the full backup copy 170. An end system change number 194 can be the largest logical time stamp which is associated with a backup copy.

The system 100 calculates the start system change number 196 for a backup copy as the minimum of the checkpoint change number 180 from the V$BACKUP_DATAFILE view for the backup copy. For example, since the system change numbers range from the value of 1578 to the value of 1594 for the full backup copy 170 of the second cluster node 110's Oracle database 158 created from 7:30 P.M. to 11:30 P.M. on April 15$^{th}$, and the second cluster node 110 created a checkpoint after committing the transactions that corresponds to the system change numbers with the values of 1578-1594, the start system change number 196's value is 1578 for the full backup copy 170. A start system change number 196 can be the smallest logical time stamp which is associated with a backup copy.

First, the system 100 identifies the attributes of the system committed change numbers 180, system change numbers 182, end times 184, database version identifiers 186, and session keys 188 and copy numbers 190 of the backup copies 170-178. Next, the system 100 determines the start system change numbers 196 as the minimums of the system committed change numbers 180, the end system change numbers 194 as the maximums of the system change numbers 182, and the natural identifiers 192 of the backup copies 170-178. Then the system 100 stores the identified attributes and the determined attributes in associated containers which may be referred to as the backup copy dependency data maps 134, hash maps, or data structures.

A minimum can be the lowest or smallest amount of a varying quantity. A maximum can be the highest or largest amount of a varying quantity. A data structure can be an organization, management, and storage format of information that enables efficient access; and modification.

For example, the backup/restore application 128 extracts the database version identifiers 186 for the backup copies 170-178, generates the copies 170-178's natural identifiers 192 based on the end time 184, the session key 188, and the copy number 190, calculates the start system change numbers 196 as the minimums of the system committed change numbers 180 for the backup copies 170-178, and calculates the end system change numbers 194 as the maximums of the system change numbers 182 for the backup copies 170-178. The backup/restore application 128 creates the backup copy dependency data maps 134 that use the database version identifiers 198 and parts of the backup copies 170-178's' natural identifiers 192 as the backup copy dependency data maps 134's keys, and use other backup copy dependency data maps 134 as the values of the backup copy dependency data maps 134. The other backup copy dependency data maps 134 use the end system change numbers 194 as their keys and use the start system change numbers 196 and the backup copies 170-178's' natural identifiers 192 as their values.

Following are descriptions of the backup copy dependency data maps 134 that the system 100 creates for finding the natural identifiers 192 of any base backup copies and any previous backup copies for any of the backup copies 170-178 that depend on any other backup copies. For example, the backup/restore application 128 uses the shared database version identifier 198 for the backup copies 170-178 and parts of these backup copies 170-178's natural identifiers 192 to access the backup copy dependency data maps 134. The backup/restore application 128 investigates whether the auxiliary backup copy 178 of the second cluster node 110's Oracle database 158', the archive log backup copy 176 of the first cluster node 108's Oracle database 148, the incremental cumulative backup copy 172 of the first cluster node 108's Oracle database 148, and the two incremental differential backup copies 174 of the first cluster node 108's Oracle database 148 are dependent backup copies. The backup/restore application 128 also investigates whether the full backup copy 170 of the second cluster node 110's Oracle database 158, the incremental cumulative backup copy 172 of the first cluster node 108's Oracle database 148, and the two incremental differential backup copies 174 of the first cluster node 108's Oracle database 148 are base backup copies or previous backup copies.

The system 100 creates a specific map of the backup copy dependency data maps 134, which may be referred to as a cumdiff_map, for finding the natural identifier 192 of any base backup copy for any of the incremental cumulative backup copies 172 and any of the incremental differential backup copies 174. If the system 100 identifies incremental cumulative backup copies 172 and incremental differential backup copies 174 as the types of the backup copies 170-178 that are investigated as the candidate dependent backup copies, then the system 100 identifies the full backup copies 170 as the types of the backup copies 170-178 that are candidate preceding backup copies. The system 100 uses the combination of incarnation numbers 198, found as the incarnation numbers 186 in the V$DATABASE_INCARNATION view, and the copy numbers 199, found as the copy numbers 190 in the V$BACKUP_PIECE_DETAILS view, for the full backup copies 170 as the keys of the cumdiff_map for finding the natural identifier 192 of any base backup copy for the incremental cumulative backup copies 172 and the incremental differential backup copies 174. The values of the cumdiff_map are other backup copy dependency data maps 134, which may be referred to as cumdiff_scn_maps, which use the end system change numbers 194 of the full backup copies 170 as their keys and use the start system change numbers 196 and the natural identifiers 192 of the full backup copies 170 as their values.

A type can be a category of information about data objects or duplicates of data objects. A candidate dependent backup copy can be a record of at least some of the information needed to restore a data object to a state at a specific time when the information was recorded, and is a prospect to need another record of the data object to restore the data object. A candidate preceding backup copy can be a record of at least some of the information needed to restore a data object to a state at a specific time when the information was recorded, and which is a prospect to be required by another record of the data object to restore the data object.

The system 100 investigates whether each incremental cumulative backup copy 172 and each incremental differential backup copy 174 depends upon a base backup copy.

The system 100 uses the incarnation number 198 and the copy number 199 of the backup copy under investigation as the keys to reference the cumdiff_map that use the incarnation numbers 198 and the copy numbers 199 of the full backup copies 170 as the keys, which identifies a specific cumdiff_scn_map as the corresponding value in the cumdiff_map. Then the system 100 compares the start system change number 196 of the backup copy under investigation to the end system change numbers 194 of the full backup copies 170 in the specific cumdiff_scn_map. The system 100 identifies every end system change number 194 of a full backup copy 170 in the specific cumdiff_scn_map which is less than or equal to the start system change number 196 of the backup copy under investigation. The system 100 identifies the maximum of the end system change numbers 194 of any full backup copy 170 in the specific cumdiff_scn_map which is less than or equal to the start system change number 196 of the backup copy under investigation. The system 100 uses the natural identifier 192 that is stored in the specific cumdiff_scn_map with the identified maximum end system change number to identify the corresponding full backup copy 170 as the base backup copy for the backup copy under investigation, which may be referred to as the previous backup copy for an incremental cumulative backup copy 172 under investigation.

If a candidate dependent incremental backup copy has the same database version identifier as the candidate preceding backup copy with the maximum end system change number which is less than or equal to the candidate dependent incremental backup copy's start system change number and/or end system change number, then the system 100 outputs identifiers of the candidate dependent incremental backup copy, the corresponding dependency, and the candidate preceding backup copy. For example, the backup/restore application 128 determines that the end system change number 194's value of 1594 for the full backup copy 170 of April 15$^{th}$ is the maximum system change number of any full backup copy 170's end system change number 194 that is less than the start system change number 196's value of 1620 for the incremental cumulative backup copy 172 of April 16$^{th}$. Therefore, the backup/restore application 128 outputs information specifying that the incremental cumulative backup copy 172 of the first cluster node 108's Oracle database 148 created from 5:00 A.M. to 6:00 A.M. on April 16$^{th}$ depends on the full backup copy 170 of the second cluster node 110's Oracle database 158 created from 7:30 P.M. to 11:30 P.M. on April 15$^{th}$.

In another example, the backup/restore application 128 determines that the end system change number 194's value of 1624 for the incremental cumulative backup copy 172 of April 16$^{th}$ is the maximum system change number of any incremental cumulative backup copy 172's end system change number 194 or any incremental differential backup copy 174's end system change number 194 that is less than the start system change number 196's value of 1630 for the first incremental differential backup copy 176 of April 16$^{th}$. Therefore, the backup/restore application 128 outputs information specifying that the first incremental differential backup copy 176 of the first cluster node 108's Oracle database 148 created from 7:30 A.M. to 8:00 A.M. on April 16$^{th}$ depends on the incremental cumulative backup copy 172 of the first cluster node 108's Oracle database 148 created from 5:00 A.M. to 6:00 A.M. on April 16$^{th}$. The backup/restore application 128 can also output information specifying that the first incremental differential backup copy 176 of the first cluster node 108's Oracle database 148 created from 7:30 A.M. to 8:00 A.M. on April 16$^{th}$ depends on the full backup copy 170 of the second cluster node 110's Oracle database 158 created from 7:30 P.M. to 11:30 P.M. on April 15$^{th}$.

The system 100 creates another specific map of the backup copy dependency data maps 134, which may be referred to as a diff_map, for finding the natural identifier 192 of any previous backup copy for incremental differential backup copies 174. If the system 100 identifies incremental differential backup copies 174 as the type of the backup copies 170-178 that are investigated as the candidate dependent backup copies, then the system 100 identifies incremental cumulative backup copies 172 and other incremental differential backup copies 174 as the type of the backup copies 170-178 that are candidate preceding backup copies. The system 100 uses the combination of the incarnation numbers 198, found as the incarnation numbers 186 in the V$DATABASE_INCARNATION view, and the copy numbers 199, found as the copy numbers 190 in the V$BACKUP_PIECE_DETAILS view, for the incremental cumulative backup copies 172 and the incremental differential backup copies 174 as the keys of the diff_map for finding the natural identifier 192 of any previous backup copy for the incremental differential backup copies 174. The values of the diff_map are other backup copy dependency data maps 134, which may be referred to as diff_scn_maps, which use the end system change numbers 194 of the incremental cumulative backup copies 172 and the incremental differential backup copies 174 as their keys and use the start system change numbers 196 and the natural identifiers 192 of the incremental cumulative backup copies 172 and the incremental differential backup copies 174 as their values.

The system 100 investigates whether each incremental differential backup copy 174 depends on a previous incremental backup copy 172 or 174 by using the incarnation number 198 and the copy number 199 of the backup copy under investigation as the keys to reference the diff_map that has the incarnation numbers 198 and the copy numbers 199 of the incremental cumulative backup copies 172 and the incremental differential backup copies 174 as keys, which identifies a specific diff_scn_map as the corresponding value in the diff_map. Then the system 100 compares the start system change number 196 of the backup copy under investigation to the end system change numbers 194 of the incremental backup copies 172 and 174 in the specific diff_scn_map. The system 100 identifies every end system change number 194 of each incremental backup copy 172 and 174 in the specific diff_scn_map which is less than or equal to the start system change number 196 of the backup copy under investigation. The system 100 identifies the maximum of the end system change numbers 194 of each incremental backup copy 172 and 174 in the specific diff_scn_map which is less than or equal to the start system change number 196 of the backup copy under investigation. The system 100 uses the natural identifier 192 that is stored in the specific diff_scn_map with the identified maximum end system change number to identify the corresponding incremental backup copy 172 or 174 as the previous backup copy for the backup copy under investigation.

If a candidate dependent differential backup copy has the same database version identifier as the candidate preceding backup copy with the maximum end system change number which is less than or equal to the candidate dependent differential backup copy's start system change number and/or end system change number, then the system 100 outputs identifiers of the candidate dependent differential backup copy, the corresponding dependency, and the candidate preceding backup copy. For example, the backup/restore application 128 determines that the end system change number 194's value of 1632 for the first incremental differential backup copy 174 of April 16$^{th}$ is the maximum system change number of any incremental cumulative backup copies 172's end system change number 194 or the incremental differential backup copy 174's end system change number 194 that is less than the start system change number 196's value of 1634 for the second incremental differential backup copy 174 of April 16$^{th}$. Therefore, the backup/restore application 128 outputs information specifying that the incremental differential backup copy 174 of the first cluster node 108's Oracle database 148 created from 8:30 A.M. to 9:00 A.M. on April 16$^{th}$ depends on the incremental differential backup copy 174 of the first cluster node 108's Oracle database 148 created from 7:30 A.M. to 8:00 A.M on April 16$^{th}$.

The system 100 creates yet another specific map of the backup copy dependency data maps 134, which may be referred to as an arch_map, for finding the natural identifier 192 of any base backup copy for an archive log backup copy 176. If the system 100 identifies archive log backup copies 176 as the type of the backup copies 170-178 that are investigated as the candidate dependent backup copies, then the system 100 identifies the full backup copies 170 as the types of the backup copies 170-178 that are candidate preceding backup copies. The system 100 uses the combination of the incarnation numbers 198, found as the incarnation numbers 186 in the V$DATABASE_INCARNATION view, and the copy numbers 199, found as the copy numbers 190 in the V$BACKUP_PIECE_DETAILS view, for the full backup copies 170 as the keys of the arch_map for finding the natural identifier 192 of any base backup copy for an archive log backup copy 176. The values of the arch_map are other backup copy dependency data maps 134, which may be referred to as arch_scn_maps, which use the end system change numbers 194 for the full backup copies 170 as their keys and the start system change numbers 196 and the natural identifiers 192 for the full backup copies 170 as their values.

The system 100 investigates whether each archive log backup copy 176 depends upon a base backup copy by using the incarnation number 198 and the copy number 199 of the backup copy under investigation as the keys to reference the arch_map that has the incarnation numbers 198 and the copy numbers 199 of the full backup copies 170 as keys, which identifies a specific arch_scn_map as the corresponding value in the arch_map. Then the system 100 compares the start system change number 196 of the backup copy under investigation to the end system change numbers 194 of the full backup copies 170 in the specific arch_scn_map. The system 100 determines whether any overlap exists between the system change numbers of the backup copy under investigation and the system change numbers of any full backup copy 170 in the specific arch_scn_map by identifying every end system change number 194 of a full backup copy 170 in the specific arch_scn_map which is between the start system change number 196 and the end system change number 194 of the backup copy under investigation.

If more than one full backup copy 170 in the specific arch_scn_map has an end system change number 194 that is between the start system change number 196 and the end system change number 194 of the backup copy under investigation, then the system 100 identifies the maximum of the end system change numbers 194 of any full backup copy 170 in the specific arch_scn_map which is less than or equal to the end system change number 194 of the backup copy under investigation. The system 100 uses the natural identifier 192 that is stored in the specific arch_scn_map with the identified maximum end system change number to identify the corresponding full backup copy 170 as the base backup copy for the backup copy under investigation.

If no full backup copy 170 in the specific arch_scn_map has an end system change number 194 that is between the start system change number 196 and the end system change number 194 of the backup copy under investigation, then the system 100 identifies the maximum of the end system change numbers 194 of any full backup copy 170 in the specific arch_scn_map which is less than or equal to the start system change number 196 of the backup copy under investigation. The system 100 uses the natural identifier 192 that is stored in the specific arch_scn_map with the identified maximum end system change number 194 to identify the corresponding full backup copy 170 as the base backup copy for the backup copy under investigation.

If the end system change time 194 of the backup copy under investigation is before the start system change time 196 of each full backup copy 170 and each incremental cumulative backup copy 172 for any database incarnation number 198's value other than 1, then the system 100 identifies the maximum of the end system change times 194 of each full backup copy 170 for the previous database incarnation number 198's value. The system 100 uses the natural identifier 192 that is stored in the specific arch_scn_map with the identified maximum end system change number 194 for the previous database incarnation number 198's value to identify the corresponding full backup copy 170 as the base backup copy for the backup copy under investigation. A base backup copy is not applicable for an archive log backup copy 176 if the database incarnation number 198's value is 1.

If a candidate dependent archive log backup copy has the same database version identifier as the candidate preceding backup copy with the maximum end system change number which is less than or equal to the candidate dependent archive log backup copy's start system change number and/or end system change number, then the system 100 outputs identifiers of the candidate dependent archive log backup copy, the corresponding dependency, and the candidate preceding backup copy. For example, the backup/restore application 128 determines that the end system change number 194's value of 1594 for the full backup copy 170 of April 15$^{th}$ is the maximum system change number of any full backup copy 170's end system change number 194 that is less than the start system change number 196's value of 1604 for the archive log backup copy 176 of April 16$^{th}$. Therefore, the backup/restore application 128 outputs information specifying that the archive log backup copy 176 of the first cluster node 108's Oracle database 148 created from 1:00 A.M. to 1:15 A.M. on April 16$^{th}$ depends on the full backup copy 170 of the second cluster node 110's Oracle database 158 created from 7:30 P.M. to 11:30 P.M. on April 15$^{th}$.

The system 100 creates an additional specific map of the backup copy dependency data maps 134, which may be referred to as an aux_map, for finding the natural identifier 192 of any base backup copy for an auxiliary backup copy 178. If the system 100 identifies auxiliary backup copies 178 as the type of the backup copies 170-178 that are investigated as the candidate dependent backup copies, then the system 100 identifies the full backup copies 170 as the types of the backup copies 170-178 that are candidate preceding backup copies, The system 100 uses the end time 184 from the V$RMAN_BACKUP_SUBJOB_DETAILS view for the full backup copies 170 as the key of the aux_map for finding the natural identifiers 192 of any base backup copy for an auxiliary backup copy 178. The values of the aux_map are the natural identifiers 192.

The system 100 investigates whether each auxiliary backup copy 178 depends upon a base backup copy by using the end time 184 of the backup copy under investigation as the key to reference the aux_map that has the end time 184 for each full backup copy 170 as keys, which identifies a natural identifier 192 as the corresponding value in the aux_map. The system 100 compares the end time 184 for the backup copy under investigation against the end time 184 for each full backup copy 170 in the aux_map. If the end time 184 for the backup copy under investigation is equivalent to the end time 184 for a full backup copy 170, this equivalent end time 184 indicates that the backup copy under investigation was created with the full backup copy 170 that has the equivalent end time 184. Therefore, the system 100 uses the natural identifier 192 that the aux_map stores with the value for the equivalent end time 184 to identify the full backup copy 170 that is the base backup copy for the backup copy that is under investigation and has the equivalent end time 184.

If the end time 184 for the backup copy under investigation is not equivalent to the end time 184 for any full backup copy 170, then the system 100 identifies the natural identifier 192 that the aux_map stores with greatest end time 184 that is less than the end time 184 for the backup copy that is under investigation as the identifier 192 of the full backup copy 170 that is base backup copy for the backup copy that is under investigation. For auxiliary backup copies 178 which have end times 184 that are less than the end times 184 for every full backup copy 170, a base backup copy is not applicable for the backup copy under investigation.

The system 100 can output identifiers of a candidate dependent backup copy that is an auxiliary backup copy 176, the corresponding dependency, and the candidate preceding backup copy, based on identifying, in the data structure 134, a maximum of end times 184 for the candidate preceding backup copies, which is less than or equivalent to an end time 184 for the candidate dependent backup copy that is the auxiliary backup copy. For example, the backup/restore application 128 determines that the end time of 11:30 P.M. on April $15^{th}$ for the full backup copy 170 of April 15 is the maximum end time of any full backup copy 170's end time 184 that is less than or equivalent to the end time of 11:30 P.M. on April $15^{th}$ for the auxiliary backup copy 178 of April $15^{th}$. Therefore, the backup/restore application 128 outputs information specifying that the auxiliary backup copy 178 of the second cluster node 110's Oracle database 158 created at 11:30 P.M. on April $15^{th}$ depends on the full backup copy 170 of the second cluster node 110's Oracle database 158 created from 7:30 P.M. to 11:30 P.M. on April $15^{th}$. Equivalent can be approximate.

The system 100 can enable an adjustment of a retention time of a candidate preceding backup copy and/or a candidate dependent backup copy associated with at a deletion, a replication, and/or a relocation. For example, the backup/restore application 128 uses the identified dependency of the backup copies 170-178 to increase the retention date for the second cluster node 110's backup copies 170 and 178 from May $15^{th}$ to May $16^{th}$. If the backup/restore application 128 had assigned a 1-month retention to the second cluster node 110's backup copies 170 and 178 of April $15^{th}$ and to the first cluster node 108's backup copies 172-176 of April $16^{th}$, this would result in the first cluster node 108's backup copies 172-176 of April $16^{th}$ becoming useless to restore the first cluster node 108's Oracle database 148 on May $15^{th}$ when the second cluster node 110's backup copies 170 and 178 of April $15^{th}$ expire.

An adjustment can be a modification. A retention time can be a chronological period associated with the continuous possession of a backup copy. A deletion can be the removal of a backup copy from a computer's storage. A replication can be the duplication of a backup copy. A relocation can be the moving of a backup copy from one computer storage to another computer storage.

Although the following paragraphs describe Dell Corporation's PowerProtect® backup/restore application, Dell-Corporation's NetWorker® backup/restore application, and Dell Corporation's Avamar® backup/restore application as examples of the backup/restore application 128, the backup/restore application 128 may be any other type of backup/restore application which provides the backup/restore functionalities described in the Background section. The backup server 112 may be any other type of backup server which provides the backup/restore functionalities described in the Background section.

The backup/restore application 128 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances. When superior performance is crucial, PowerProtect® Data Manager provides a direct path between Dell tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 128 may be an Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 128 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types. The storage array 114 may be a Dell Corporation's Powermax, a Dell Corporation XIO, or a Dell Corporation Unity storage array.

The system 100 may include different policies for various data protection levels, such as a "gold" policy for VMware® clients, a "platinum" policy for UNIX® clients, and a "silver" policy for Windows® clients. The gold policy can specify to store 2 backup copies for each VMware® client's application resources onto the first disk 120 for 6 months, store a primary clone of the backup copies onto the second disk 122 for 1 year, and store a secondary clone of the backup copies onto a tape, which is not depicted in FIG. 1, for 5 years. In another example, a policy can provide redundancy by specifying to replicate each full backup copy to three different backups servers, replicate each incremental cumulative backup copy and each incremental differential backup copy to two different backup servers, replicate each archive log backup copy to one additional backup server, and relocate each full backup copy created at the end of the month to cloud tiering 116 for long term retention. Backup copies stored in the cloud tiering 116 have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can specifies the target storage device where backup copies are stored, such as the first disk 120, the second disk 122, the third disk 124, and/or cloud-tiering 116.

Figure 2:
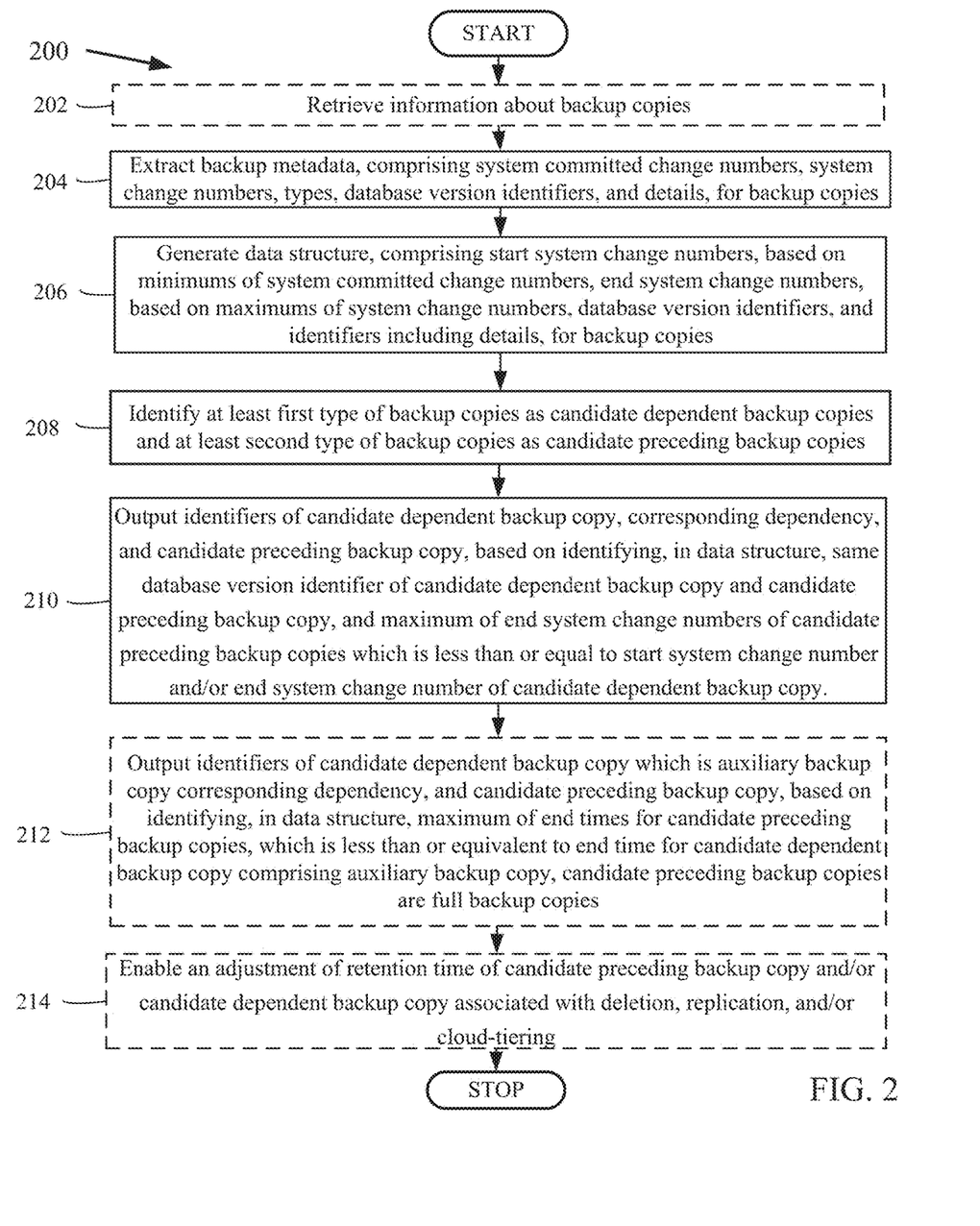
FIG. 2 is a flowchart that illustrates a method of identifying database backup copy chaining, under an embodiment.

FIG. 2 is a flowchart that illustrates a method for identifying database backup copy chaining, under an embodiment. Flowchart 200 illustrates method acts illustrated as flowchart blocks for certain steps involved in the backup server 112, the clients 102-110, and/or between the clients 102-110 and the backup server 112 of FIG. 1.

Information about backup copies is optionally retrieved, block 202. A system can request the discovery of an application host's resources. For example, and without limitation, this can include the discovery module 132 making REST application programming interface calls requests for the application host agent-services 136 and 140 to discover their client application resources, which include the Oracle control files 152 and 162 if the clients 108 and 110 are independent application hosts 108 and 110, or include the Oracle control file 168 if the clients 108 and 110 are the first cluster node 108 and the second cluster node 110 in an Oracle Real Application Cluster connected by the cluster architecture 118.

After retrieving information about backup copies, backup metadata, comprising system committed change numbers, system change numbers, types, database version identifiers, and details, for backup copies is extracted, block 204. The system extracts backup copies' metadata from a parameter file. By way of example and without limitation, this can include the discovery module 132 accessing the first cluster node 108 while the second cluster node 110 is unavailable, and extracting backup metadata from the Oracle control file 168 about the full backup copy 170 of the second cluster node 110's Oracle database 158 created from 7:30 P.M. to 11:30 P.M. on April $15^{th}$, the auxiliary backup copy 178 of the second cluster node 110's Oracle database 158 created at 11:30 P.M. on April $15^{th}$, and the archive log backup copy 176 of the first cluster node 108's Oracle database 148 created from 1:00 A.M. to 1:15 A.M. on April $16^{th}$. The discovery module 132 also extracts backup metadata from the Oracle control file 168 about the incremental cumulative backup copy 172 of the first cluster node 108's Oracle database 148 created from 5:00 A.M. to 6:00 A.M. on April $16^{th}$, the incremental differential backup copy 174 of the first cluster node 108's Oracle database 148 created from 7:30 A.M. to 8:00 A.M. on April $16^{th}$, and the other incremental differential backup copy 174 of the first cluster node 108's Oracle database 148 created from 8:30 A.M. to 9:00 A.M. on April $16^{th}$.

Following the extraction of specific backup copies' metadata, a data structure, comprising start system change numbers, based on minimums of the system committed change numbers, end system change numbers, based on maximums of the system change numbers, the database version identifiers, and identifiers including the details, is generated for the backup copies, block 206. The system processes and stores specific information about backup copies into maps for investigating dependencies of backup copies. In embodiments, this can include the backup/restore application 128 extracting the database version identifiers 186 for the backup copies 170-178, generating the backup copies 170-178's natural identifiers 192, calculating the start system change numbers 196 as the minimums of the system committed change numbers 180 for the backup copies 170-178, and calculating the end system change numbers 194 as the maximums of the system change numbers 182 for the backup copies 170-178. The backup/restore application 128 creates the backup copy dependency data maps 134, which use the database version identifiers 198 and parts of the backup copies 170-178's' natural identifiers 192 as the backup copy dependency data maps 134's keys, and use other backup copy dependency data maps 134 as their values of the backup copy dependency data maps 134. The other backup copy dependency data maps 134 use the end system change numbers 194 as their keys and use the start system change numbers 196 and the backup copies 170-178's' natural identifiers 192 as their values.

Having stored specific information about backup copies into a data structure, at least a first type of the backup copies is identified as candidate dependent backup copies and at least a second type of the backup copies is identified as candidate preceding backup copies, block 208. The system uses the maps' keys to investigate which backup copies depend on which other backup copies. For example, and without limitation, this can include the backup/restore application 128 using the shared database version identifier 198 for some of the backup copies 170-178 and parts of these backup copies 170-178's natural identifiers 192 to access the backup copy dependency data maps 134. The backup/restore application 128 investigates whether the auxiliary backup copy 178 of the second cluster node 110's Oracle database 158', the archive log backup copy 176 of the first cluster node 108's Oracle database 148, the incremental cumulative backup copy 172 of the first cluster node 108's Oracle database 148, and the two incremental differential backup copies 174 of the first cluster node 108's Oracle database 148 are dependent backup copies. The backup/restore application 128 also investigates whether the full backup copy 170 of the second cluster node 110's Oracle database 158, the incremental cumulative backup copy 172 of the first cluster node 108's Oracle database 148, and the two incremental differential backup copies 174 of the first cluster node 108's Oracle database 148 are base backup copies or previous backup copies After investigating, identifiers of a candidate dependent backup copy, a corresponding dependency, and a candidate preceding backup copy are output, based on identifying, in a data structure, the same database version identifier of the candidate dependent backup copy and the candidate preceding backup copy, and the maximum of the end system change numbers of the candidate preceding backup copies which is less than or equal to the start system change number and/or the end system change number of the candidate dependent backup copy, block 210. The system identifies which backup copies depend on which other backup copies by comparing backup copies' system change numbers. By way of example and without limitation, this can include the backup/restore application 128 determining that the end system change number 194's value of 1594 for the full backup copy 170 of April 15$^{th}$ is the maximum system change number of any full backup copy 170's end system change number 194 that is less than the start system change number 196's value of 1604 for the archive log backup copy 176 of April 16$^{th}$. Therefore, the backup/restore application 128 outputs information specifying that the archive log backup copy 176 of the first cluster node 108's Oracle database 148 created from 1:00 A.M. to 1:15 A.M. on April 16$^{th}$ depends on the full backup copy 170 of the second cluster node 110's Oracle database 158 created from 7:30 P.M. to 11:30 P.M. on April 15$^{th}$.

In another example, the backup/restore application 128 determines that the end system change number 194's value of 1594 for the full backup copy 170 of April 15$^{th}$ is the maximum system change number of any full backup copy 170's end system change number 194 that is less than the start system change number 196's value of 1620 for the incremental cumulative backup copy 172 of April 16$^{th}$. Therefore, the backup/restore application 128 outputs information specifying that the incremental cumulative backup copy 172 of the first cluster node 108's Oracle database 148 created from 5:00 A.M. to 6:00 A.M. on April 16$^{th}$ depends on the full backup copy 170 of the second cluster node 110's Oracle database 158 created from 7:30 P.M. to 11:30 P.M. on April 15$^{th}$.

In yet another example, the backup/restore application 128 determines that the end system change number 194's value of 1624 for the incremental cumulative backup copy 172 of April 16$^{th}$ is the maximum system change number of any incremental cumulative backup copy 172's end system change number 194 or any incremental differential backup copy 174's end system change number 194 that is less than the start system change number 196's value of 1630 for the first incremental differential backup copy 176 of April 16$^{th}$. Therefore, the backup/restore application 128 outputs information specifying that the first incremental differential backup copy 176 of the first cluster node 108's Oracle database 148 created from 7:30 A.M. to 8:00 A.M. on April 16$^{th}$ depends on the incremental cumulative backup copy 172 of the first cluster node 108's Oracle database 148 created from 5:00 A.M. to 6:00 A.M. on April 16$^{th}$.

In an additional example, the backup/restore application 128 determines that the end system change number 194's value of 1632 for the first incremental differential backup copy 174 of April 16$^{th}$ is the maximum system change number of any incremental backup copy 172 or 174's end system change number 194 that is less than the start system change number 196's value of 1634 for the second incremental differential backup copy 174 of April 16$^{th}$. Therefore, the backup/restore application 128 outputs information specifying that the incremental differential backup copy 174 of the first cluster node 108's Oracle database 148 created from 8:30 A.M. to 9:00 A.M. on April 16$^{th}$ depends on the incremental differential backup copy 174 of the first cluster node 108's Oracle database 148 created from 7:30 A.M. to 8:00 A.M on April 16$^{th}$.

Additionally, identifiers of a candidate dependent backup copy that is an auxiliary backup copy, a corresponding dependency, and a candidate preceding backup copy are optionally output, based on identifying, in a data structure, the maximum of end times for the candidate preceding backup copies, which is less than or equivalent to the end time for the candidate dependent backup copy that is the auxiliary backup copy, with the candidate preceding backup copies being full backup copies block 212. The system can identify which auxiliary backup copies depend on which other backup copies by comparing backup copies' end times. In embodiments, this can include the backup/restore application 128 determining that the end time of 11:30 P.M. on April 15$^{th}$ for the full backup copy 170 of April 15 is the maximum end time of any full backup copy 170's end time 184 that is less than or equivalent to the end time of 11:30 P.M. on April 15$^{th}$ for the auxiliary backup copy 178 of April 15$^{th}$. Therefore, the backup/restore application 128 outputs information specifying that the auxiliary backup copy 178 of the second cluster node 110's Oracle database 158 created at 11:30 P.M. on April 15$^{th}$ depends on the full backup copy 170 of the second cluster node 110's Oracle database 158 created from 7:30 P.M. to 11:30 P.M. on April 15$^{th}$.

After outputting an identification of a candidate dependent backup copy, a corresponding dependency, and a candidate preceding backup copy, an adjustment is optionally enabled of a retention time of the candidate preceding backup copy and/or the candidate dependent backup copy associated with a deletion, a replication, and/or a relocation, block 214. The system can adjust retention time based on dependencies of backup copies. For example, and without limitation, this can include the backup/restore application 128 using the identified dependencies of the backup copies 170-178 to increase the retention date for the second cluster node 110's backup copies 170 and 178 from May 15$^{th}$ to May 16$^{th}$. If the backup/restore application 128 had assigned a 1-month retention to the second cluster node 110's backup copies 170 and 178 of April 15$^{th}$ and to the first cluster node 108's backup copies 172-176 of April 16$^{th}$, this would have resulted in the first cluster node 108's backup copies 172-176 of April 16$^{th}$ becoming useless to restore the Oracle database 148 to the state of the Oracle database 148 on April 16$^{th}$, when the second cluster node 110's backup copies 170 and 178 of April 15$^{th}$ expire on May 15$^{th}$.

While the examples above describe components of the backup server 112 executing the actions in the blocks 204-212, in some embodiments, components of the clients 108 and 110 may execute the actions in the blocks 204-212. For example, the first application host agent-service or agent 136 uses the Oracle Plug-in or Add-on 138 to identify information from Oracle control file(s) about backup copies, process and store specific information about backup copies into maps, use the maps' keys to investigate and identify which backup copies depend on which other backup copies, then output the identified dependencies between backup copies and the natural identifiers 192 of any dependent, base, and previous backup copies to the backup/restore application 128. Then the backup/restore application 128 can use the natural identifiers 192 of any dependent, base, and previous backup copies to adjust the retention time of the backup copies 170-178 accordingly.

Although FIG. 2 depicts the blocks 202-214 occurring in a specific order, the blocks 202-214 may occur in another order. In other implementations, each of the blocks 202-214 may also be executed in combination with other blocks and/or some blocks may be divided into a different set of blocks.

Figure 3:
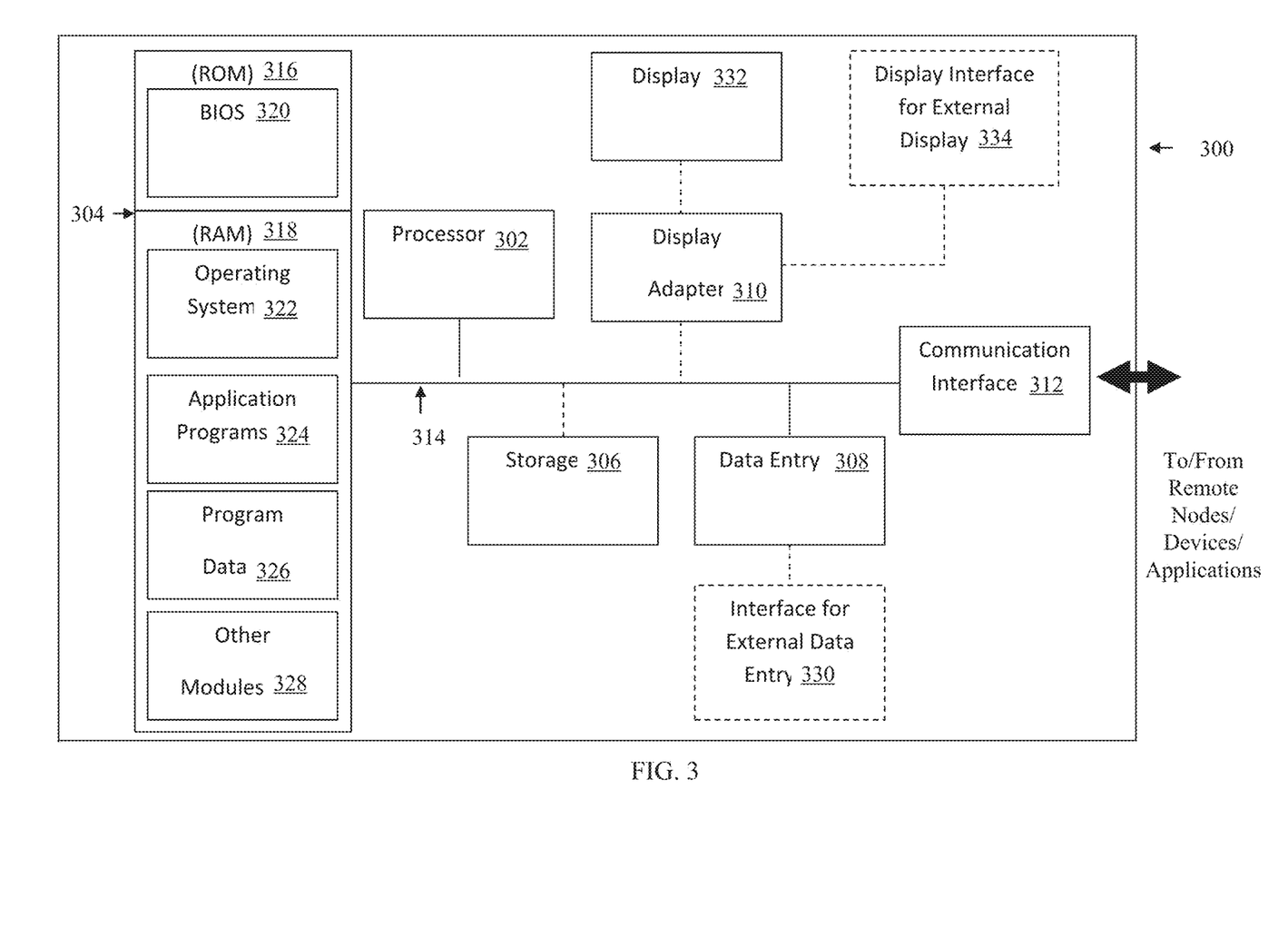
FIG. 3 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for identifying database backup copy chaining, comprising:
   one or more processors; and
   a non-transitory computer readable medium storing a plurality of instructions, which when executed, cause the one or more processors to:
   extract backup metadata, comprising system committed change numbers, system change numbers, types, database version identifiers, and details, for backup copies;
   generate a data structure, comprising start system change numbers, based on minimums of the system committed change numbers, end system change numbers, based on maximums of the system change numbers, the database version identifiers, and identifiers including the details, for the backup copies;
   identify at least a first type of the backup copies as candidate dependent backup copies and at least a second type of the backup copies as candidate preceding backup copies; and
   output identifiers of a candidate dependent backup copy, a corresponding dependency, and a candidate preceding backup copy, based on identifying, in the data structure, a same database version identifier of the candidate dependent backup copy and the candidate preceding backup copy, and a maximum of end system change numbers of the candidate preceding backup copies which is one of less than and equal to at least one of a start system change number and an end system change number of the candidate dependent backup copy.

2. The system of claim 1, wherein the plurality of instructions further causes the one or more processors to:
retrieve information about the backup copies; and
enable an adjustment of a retention time of at least one of the candidate preceding backup copy and the candidate dependent backup copy associated with at least one of a deletion, a replication, and a relocation.

3. The system of claim 2, wherein retrieving information about the backup copies comprises communicating a discovery request for application resources between a backup server and an application host.

4. The system of claim 1, wherein the candidate preceding backup copies comprise full backup copies, and the candidate dependent backup copies comprise incremental cumulative backup copies and incremental differential backup copies.

5. The system of claim 1, wherein the candidate preceding backup copies comprise incremental cumulative backup copies and first incremental differential backup copies and the candidate dependent backup copies comprise second incremental differential backup copies.

6. The system of claim 1, wherein the candidate preceding backup copies comprise full backup copies and the candidate dependent backup copies comprise archive log backup copies.

7. The system of claim 1, wherein the plurality of instructions further causes the one or more processors to output identifiers of a particular candidate dependent backup copy comprising an auxiliary backup copy, a corresponding dependency, and the candidate preceding backup copy, based on identifying, in the data structure, a maximum of end times for the candidate preceding backup copies, which is one of less than and equivalent to an end time for the particular candidate dependent backup copy comprising the auxiliary backup copy, the candidate preceding backup copies comprising full backup copies.

8. A computer-implemented method for identifying database backup copy chaining, the computer-implemented method comprising:
extracting backup metadata, comprising system committed change numbers, system change numbers, types, database version identifiers, and details, for backup copies;
generating a data structure, comprising start system change numbers, based on minimums of the system committed change numbers, end system change numbers, based on maximums of the system change numbers, the database version identifiers, and identifiers including the details, for the backup copies;
identifying at least a first type of the backup copies as candidate dependent backup copies and at least a second type of the backup copies as candidate preceding backup copies; and
outputting identifiers of a candidate dependent backup copy, a corresponding dependency, and a candidate preceding backup copy, based on identifying, in the data structure, a same database version identifier of the candidate dependent backup copy and the candidate preceding backup copy, and a maximum of end system change numbers of the candidate preceding backup copies which is one of less than and equal to at least one of a start system change number and an end system change number of the candidate dependent backup copy.

9. The computer-implemented method of claim 8, wherein the computer-implemented method further comprises:
retrieving information about the backup copies; and
enabling an adjustment of a retention time of at least one of the candidate preceding backup copy and the candidate dependent backup copy associated with at least one of a deletion, a replication, and a relocation.

10. The computer-implemented method of claim 9, wherein retrieving information about the backup copies comprises communicating a discovery request for application resources between a backup server and an application host.

11. The computer-implemented method of claim 8, wherein the candidate preceding backup copies comprise full backup copies, and the candidate dependent backup copies comprise incremental cumulative backup copies and incremental differential backup copies.

12. The computer-implemented method of claim 8, wherein the candidate preceding backup copies comprise incremental cumulative backup copies and first incremental differential backup copies and the candidate dependent backup copies comprise second incremental differential backup copies.

13. The computer-implemented method of claim 8, wherein the candidate preceding backup copies comprise full backup copies and the candidate dependent backup copies comprise archive log backup copies.

14. The computer-implemented method of claim 8, wherein the computer-implemented method further comprises outputting identifiers of a particular candidate dependent backup copy comprising an auxiliary backup copy, a corresponding dependency, and the candidate preceding backup copy, based on identifying, in the data structure, a maximum of end times for the candidate preceding backup copies, which is one of less than and equivalent to an end time for the particular candidate dependent backup copy comprising the auxiliary backup copy, the candidate preceding backup copies comprising full backup copies.

15. A computer program product, comprising a non-transitory computer-readable medium having a computer-readable program code embodied therein to be executed by one or more processors, the program code including instructions to:
extract backup metadata, comprising system committed change numbers, system change numbers, types, database version identifiers, and details, for backup copies;
generate a data structure, comprising start system change numbers, based on minimums of the system committed change numbers, end system change numbers, based on maximums of the system change numbers, the database version identifiers, and identifiers including the details, for the backup copies;
identify at least a first type of the backup copies as candidate dependent backup copies and at least a second type of the backup copies as candidate preceding backup copies; and
output identifiers of a candidate dependent backup copy, a corresponding dependency, and a candidate preceding backup copy, based on identifying, in the data structure, a same database version identifier of the candidate dependent backup copy and the candidate preceding backup copy, and a maximum of end system change numbers of the candidate preceding backup copies which is one of less than and equal to at least one of a start system change number and an end system change number of the candidate dependent backup copy.

16. The computer program product of claim 15, wherein the program code includes further instructions to:
- retrieve information about the backup copies, wherein retrieving information about the backup copies comprises communicating a discovery request for application resources between a backup server and an application host, and
- enable an adjustment of a retention time of at least one of the candidate preceding backup copy and the candidate dependent backup copy associated with at least one of a deletion, a replication, and a relocation.

17. The computer program product of claim 15, wherein the candidate preceding backup copies comprise full backup copies, and the candidate dependent backup copies comprise incremental cumulative backup copies and incremental differential backup copies.

18. The computer program product of claim 15, wherein the candidate preceding backup copies comprise incremental cumulative backup copies and first incremental differential backup copies and the candidate dependent backup copies comprise second incremental differential backup copies.

19. The computer program product of claim 15, wherein the candidate preceding backup copies comprise full backup copies and the candidate dependent backup copies comprise archive log backup copies.

20. The computer program product of claim 15, wherein the program code includes further instructions to output identifiers of a particular candidate dependent backup copy comprising an auxiliary backup copy, a corresponding dependency, and the candidate preceding backup copy, based on identifying, in the data structure, a maximum of end times for the candidate preceding backup copies, which is one of less than and equivalent to an end time for the particular candidate dependent backup copy comprising the auxiliary backup copy, the candidate preceding backup copies comprising full backup copies.

* * * * *